United States Patent
Harirchi et al.

(10) Patent No.: US 12,444,929 B2
(45) Date of Patent: Oct. 14, 2025

(54) ADAPTIVE IMPEDANCE PROTECTION

(71) Applicant: S&C Electric Company, Chicago, IL (US)

(72) Inventors: Farnaz Harirchi, Glenview, IL (US); John French, Chicago, IL (US); Oleg Nazarov, Okemos, MI (US); Gabrielle Madden, Chicago, IL (US); Goran Djogo, Mount Prospect, IL (US)

(73) Assignee: S&C Electric Company, Chicago, IL (US)

( * ) Notice: Subject to any disclaimer, the term of this patent is extended or adjusted under 35 U.S.C. 154(b) by 151 days.

(21) Appl. No.: 18/438,728

(22) Filed: Feb. 12, 2024

(65) Prior Publication Data

US 2024/0332953 A1 Oct. 3, 2024

Related U.S. Application Data

(60) Provisional application No. 63/456,102, filed on Mar. 31, 2023.

(51) Int. Cl.
*H02H 7/26* (2006.01)
*G01R 27/16* (2006.01)

(52) U.S. Cl.
CPC ............... *H02H 7/26* (2013.01); *G01R 27/16* (2013.01)

(58) Field of Classification Search
CPC .................................. H02H 7/26; G01R 27/16
See application file for complete search history.

(56) References Cited

U.S. PATENT DOCUMENTS

| | | | |
|---|---|---|---|
| 2015/0226780 A1* | 8/2015 | Sun | G01R 31/086 702/59 |
| 2016/0011252 A1* | 1/2016 | Kang | H02H 7/26 702/59 |
| 2022/0229099 A1* | 7/2022 | Pradhan | H02H 1/0007 |
| 2023/0327426 A1* | 10/2023 | Pradhan | H02H 1/0092 361/78 |

* cited by examiner

*Primary Examiner* — Scott Bauer

(57) ABSTRACT

A system and method for adaptive impedance protection in a power network. The method includes determining a measured impedance in an upstream interrupting device, determining an impedance set point in the upstream interrupting device, and identifying a predetermined percentage of the impedance set point. The method also includes determining if the measured impedance falls below the predetermined percentage, determining whether a change in a measured current value on the power line is less than a threshold change value in a downstream interrupting device, and sending the determination of whether the change in the measured current value is less than the threshold change value from the downstream interrupting device to the upstream interrupting device. The upstream interrupting device is opened if the measured impedance falls below the predetermined percentage of the impedance set point and the change in the measured current value is less than the threshold change value.

20 Claims, 1 Drawing Sheet

ADAPTIVE IMPEDANCE PROTECTION

CROSS-REFERENCE TO RELATED APPLICATION

This application claims the benefit of priority from the U.S. Provisional Application No. 63/456,102, filed on Mar. 31, 2023, the disclosure of which is hereby expressly incorporated herein by reference for all purposes.

BACKGROUND

Field

This disclosure relates generally to an adaptive impedance protection scheme operating in an electrical network including downstream fault verification and adapted impedance set point.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three phase feeders including three single phase feeder lines that carry similar current magnitudes but are 120° apart in phase. three phase and single-phase lateral lines are tapped from the feeder that provide the medium voltage to various distribution transformers, where the voltage is stepped down to a low voltage and is provided to loads, such as homes, businesses, etc. Power distribution networks of the type referred to above typically include switching devices, breakers, reclosers, interrupters, etc. that control the flow of power throughout the network.

Periodically, faults occur in the distribution network as a result of various things, such as animals touching the lines, lightning strikes, tree branches falling on the lines, vehicle collisions with utility poles, etc. Faults may create a short-circuit that increases the stress on the network, which may cause the current flow to significantly increase, for example, many times above the normal current, along the fault path. This amount of current causes the electrical lines to significantly heat up and possibly melt, and also could cause mechanical damage to various components in the network. These faults are often transient or intermittent faults as opposed to a persistent or bolted fault, where the thing that caused the fault is removed a short time after the fault occurs, for example, a lightning strike. In such cases, the distribution network will almost immediately begin operating normally after a brief disconnection from the source of power.

Traditionally, a fuse is employed as a primary overcurrent protection device for protecting distribution transformers and other devices that has a certain rating so that the fuse will operate above a transformer inrush current, but below a transformer through fault protection withstand or damage curve. However, fuses often expel arc byproducts such as gas, sparks, molten debris, etc. when they operate, which has disadvantages.

It has become increasingly popular to replace the traditional fuse with a fault interrupting device including, for example, a vacuum interrupter and an actuator to operate the vacuum interrupter. A vacuum interrupter is a switch that employs opposing contacts, one fixed and one movable, positioned within a vacuum enclosure. When the vacuum interrupter is opened by operating the actuator to move the movable contact away from the fixed contact to prevent current flow through the interrupter a plasma arc is created between the contacts that is contained and quickly extinguished by the vacuum at the next zero current crossing. When fault current is detected by the device the vacuum interrupter is opened and the device displays an indication of operation, such as being released or "dropping out" from its mounting.

Reclosers that employ fault interrupters and actuators are also provided as protection devices on utility poles. These reclosers typically detect the current and/or voltage on the line to monitor current flow and have controls that indicate problems with the network circuit, such as detecting a high current fault event. If such a high fault current is detected the vacuum interrupter is opened in response thereto, and then after a short delay closed to determine whether the fault is a transient fault. If high fault current flows when the recloser is closed after opening, it is immediately re-opened. If the fault current is detected a second time, or multiple times, during subsequent opening and closing operations indicating a persistent fault, then the recloser remains open and it may drop out of its mounting or provide another form of indication that it is locked open, where the time between detection tests may increase after each test.

Power generation sources, such as photovoltaic cells, generators, battery modules, wind turbines, etc., may be distributed throughout an electrical grid. The distributed power sources may be generating power during normal operation, where the power sources may be reducing the amount of power that the loads are drawing from the electrical grid or may be placing power onto the electrical grid.

A typical power protection and coordination scheme for fault detection and clearing in an electrical grid measures overcurrent. However, for current and future electrical grids that may employ many distributed power sources of various types, overcurrent detection presents challenges, such as current contributions to the grid from distributed power sources, reduced fault current levels from inverter-based resources (IBRs), etc.

It is known in the art to detect a fault in high voltage transmission lines using impedance measurements based on the known impedance of the line and the available level of fault current. During normal operation, the load on the high voltage line presents as a high impedance to the generation source, and when a fault occurs on the line, the increase in current lowers the measured value of the impedance at any voltage. Therefore, a protection method can be designed that measures impedance in the line and identifies a fault if the impedance falls below a threshold. However, transmission impedance fault detection schemes generally are not applicable to the medium voltage distribution grid because of overreaching protective devices placed at lateral taps, the variable nature of distribution loads, etc. and, in the presence of distribution generation because of changing grid conditions as a result of load current contributions from the distributed energy sources, lower fault current levels, bi-directional current flows, etc. Therefore, adaptive protection in future grids with varying available fault current is needed.

SUMMARY

The following discussion discloses and describes a system and method for operating an adaptive impedance protection scheme in a power network including interrupting devices dispersed along an AC power line. The method includes determining a measured impedance on the power line in an upstream interrupting device, determining an impedance set point in the upstream interrupting device, and identifying a predetermined percentage of the impedance set point. The method also includes determining if the measured impedance falls below the predetermined percentage of the impedance set point, determining whether a change in a measured current value on the power line is less than a threshold change value in a downstream interrupting device, and sending the determination of whether the change in the measured current value is less than the threshold change value from the downstream interrupting device. The upstream interrupting device is opened if the measured impedance falls below the predetermined percentage of the impedance set point and the change in the measured current value is less than the threshold change value. The impedance set point is updated with the measured impedance if the measured impedance falls below the predetermined percentage of the impedance set point and the change in the measured current value is greater than the threshold change value.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to an adaptive impedance protection scheme operating in an electrical network is merely exemplary in nature, and is in no way intended to limit the disclosure or its applications or uses.

This disclosure proposes an adaptive impedance protection scheme for a transmission grid or distribution grid that measures impedance to increase the speed of protection as well as sensitivity, especially for future grids having integration of IBRs and variable loads, such as EVs. Bi-directional power and lower available fault currents are the consequences of having IBR based systems that require updating the protection settings.

Figure 1:
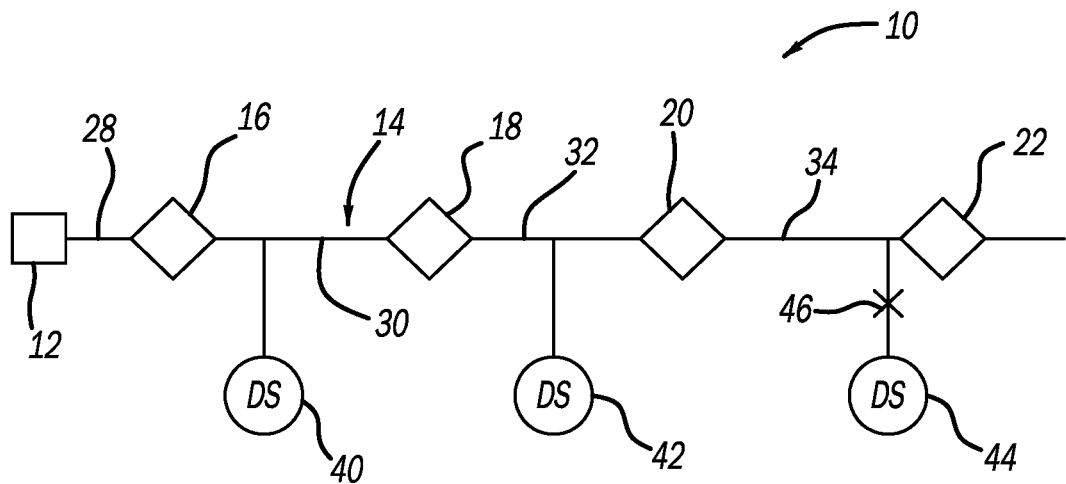
FIG. 1 is a simplified schematic type diagram of an electrical power distribution network.

FIG. 1 is a simplified schematic type diagram of an electrical power distribution network 10. The network 10 includes an AC power source 12, such as an electrical substation that steps down high voltage power from a high voltage power line (not shown) to medium voltage power, and delivers power to a power line 14, such as a feeder. The network 10 also includes fault protection interrupting devices 16, 18, 20 and 22 positioned along the line 14, where the interrupting devices 16-22 can be any suitable protection device for the purposes discussed herein, such as reclosers, breakers, sectionalizers, etc. A line segment 28 is provided between the source 12 and the device 16, a line segment 30 is provided between the devices 16 and 18, a line segment 32 is provided between the devices 18 and 20, and a line segment 34 is provided between the devices 20 and 22. A distributed power generation source 40 is coupled to the line segment 30, a distributed power generation source 42 is coupled to the line segment 32 and a distributed power generation source 44 is coupled to the line segment 34. Any of the power generation sources 40, 42 or 44 may be separated from the network 10 and be islanded where they provide power to various loads (not shown). For example, a switch 46 may be opened to disconnect the power source 44 from the line segment 34.

Figure 2:
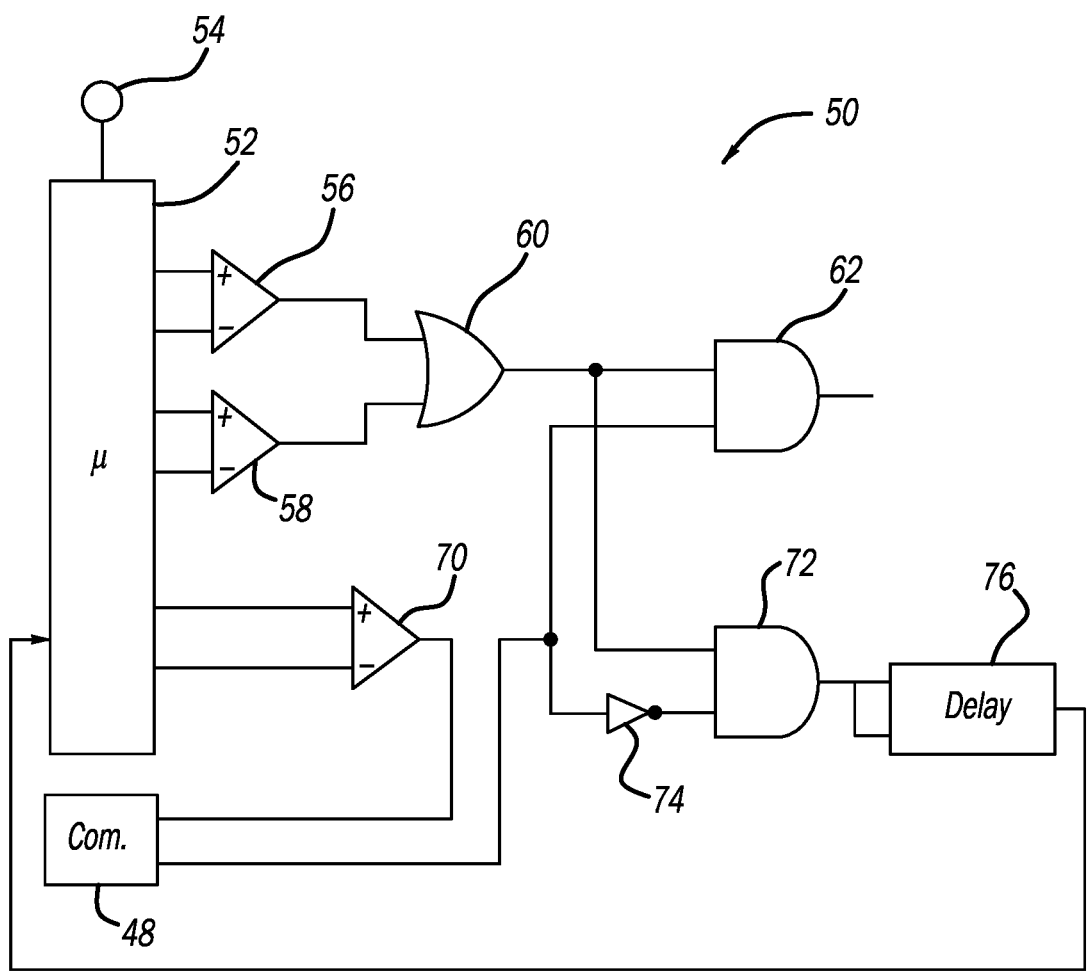
FIG. 2 is a schematic diagram of a logic circuit operating an adaptive impedance protection scheme in the network shown in FIG. 1.

FIG. 2 is a schematic diagram of an adaptive impedance logic circuit 50 operating in a relay in the devices 16-22, where the device 18 is used for the discussion below. The device 18 includes a processor 52 and a communications module 48 that may be integral with or separate from the processor 52. The processor 52 receives voltage and current measurements on the line 14 from sensors 54 and calculates the impedance Z as V/I as a vector quantity, referred to herein as the measured impedance Z. The voltage and current on the line 14 are sine waves that have a relative phase, and thus have a real component and an imaginary component based on the difference in phase, where if they are in phase, then the impedance is completely real and if they are 90° out of phase the impedance is completely imaginary. A fault with greater real characteristics is more resistive and a fault with greater imaginary characteristics is more inductive. The logic circuit 50 as described will actually be running in software in the processor 52.

An impedance set point $Z_{set}$ is determined and stored, which is the measured impedance Z at certain points in time when no fault is present, and which will be updated automatically, as will be described in detail below, when tangible changes occur in the loads or the power sources. A predetermined percentage of the impedance set point $Z_{set}$ is determined by the processor 52, for example, 70%, to detect resistive faults up to 200Ω, and 70% of the real component of the impedance set point $Re(Z_{set})$ is sent to a positive terminal of a comparator 56 and 70% of the imaginary component of the impedance set point $Im(Z_{set})$ is sent to a positive terminal of a comparator 58. The real component of the measured impedance $Re(Z)$ is sent to a negative terminal of the comparator 56 and the imaginary component of the measured impedance $Im(Z)$ is sent to a negative terminal of the comparator 58, where the output of the comparators 56 and 58 are provided to an OR gate 60. If the real component of the measured impedance $Re(Z)$ is less than 70% of the real component of the impedance set point $Re(Z_{set})$, possibly because of high fault current, then a high signal is provided to the OR gate 60, and if the imaginary component of the measured impedance $Im(Z)$ is less than 70% of the imaginary component of the impedance set point $Im(Z_{set})$, possibly because of high fault current, then a high signal is provided to the OR gate 60. Thus, if the measured impedance Z falls low enough in a particular line segment so that either of the inputs to the OR gate 60 is high, the OR gate 60 outputs a high signal to an input terminal of an AND gate 62, where a high signal at the output of the AND gate 62 provides a trip command to open the device 18.

When the network 10 experiences an increase in load or the distributed power sources 40, 42 and/or 44 provide additional current to the line 14, the measured impedance Z on the line segment is reduced, which could provide a high output from the OR gate 60 when no fault is present. To prevent the device 18 from tripping open in that situation, the adaptive impedance protection scheme described herein requires receiving a conditional flag from the first device 20 downstream of the device 18 that is provided to the AND gate 62 to send a trip command, and thus the load increase and/or islanding conditions alone will not trip the device 18. More particularly, the downstream device 20, which is also running the logic circuit 50, calculates an AIDS current value in the processor 52 as:

$$\Delta I_{DS} = |I_t| - |I_{t-1}|$$

where $I_t$ is the instantaneous current at time t and $I_{t-1}$ is the instantaneous current at one cycle prior to time t.

The $\Delta I_{DS}$ current value is compared to a threshold current value, which is 1 A in this non-limiting example, and is selected based on preliminary simulation results for a 300Ω resistance fault, which provides the impedance for a potential or likely fault. For faults in the line segment 32 between the devices 18 and 20 with less resistance than 300Ω, the $\Delta I_{DS}$ current value for the downstream device 20 is decreased by more than 1 A, so the scheme described herein is able to selectively detect those faults. The negative of the threshold current value, −1 in this example, is provided to a positive terminal of a comparator 70, which would be operating in the processor 52 in the device 20 in this example, and the $\Delta I_{DS}$ current value is sent to a negative terminal of the comparator 70. If the $\Delta I_{DS}$ current value is greater than the threshold current value, then the device 20 will transmit a 0 flag to the device 18 indicating that there is no fault in the line segment 32 between the devices 18 and 20, but possibly a fault downstream of the device 20, and if the $\Delta I_{DS}$ current value is less than or equal to the threshold current value, which would occur if there is a fault in the line segment 32 between the devices 18 and 20, then the communications module 48 in the device 20 will transmit a 1 flag to the communications module 48 in the device 18 indicating a potential fault upstream of the device 20. Any suitable message transmission scheme can be employed by the communications module 48, such as wireless communications, optical communications, power line communications, etc. The fault flag received by the communications module 48 in the device 18 is sent to the other terminal of the AND gate 62 in the device 18, so that if the output of the OR gate 60 is high and the received fault flag is 1, then a trip command is sent to open the device 18.

In a no-fault condition, if changes occur in the distributed power sources 40, 42 and 44, the $\Delta I_{DS}$ current value at the device upstream of an islanded device will be positive so the measured impedance Z at the islanded device will reduce and the output of the OR gate 60 will be high. Likewise, for the downstream device, the $\Delta I_{DS}$ current value is close to zero, and thus below the threshold current value, and it will send the 0 flag to the upstream device. Therefore, in the event of loss of power generation, the upstream device will see a decrease in the measured impedance Z, but because of receiving the 0 flag from the downstream device it will know that the change in the measured impedance Z is not due to a fault and will not open.

As mentioned, the measured impedance Z may be influenced by the distributed power sources 40, 42 and/or 44 providing current into the network 10, and thus they can affect the performance of the impedance protection scheme, especially in weak grids. For example, if the distributed power sources 40, 42 and 44 go into an island mode, the measured impedance Z will be smaller than the impedance set point $Z_{set}$. Therefore, the impedance protection scheme is designed to mitigate the effects of the distributed power sources 40, 42 and 44 and to update the protection settings based on the current capacity of the distributed power sources 40, 42 and 44 at any instantaneous point in time and the changing loads on the network 10.

The impedance protection scheme described herein automatically updates the impedance set point $Z_{set}$ with the measured impedance Z after a predetermined delay, for example, a 6-cycle delay, if the real component of the measured impedance Re(Z) is less than 70% of the real component of the impedance set point Re($Z_{set}$) or the imaginary component of the measured impedance Im(Z) is less than 70% of the imaginary component of the impedance set point Im($Z_{set}$) and the $\Delta I_{DS}$ current value in the downstream device 20 is greater than the threshold current value, i.e., the 0 fault flag is sent. The 6-cycle delay is implemented so that in a case where a fault occurs downstream of the device 20 in this example, it is cleared by the closest upstream protection device and not the device 18. The determination of 6 cycles as a delay is based on a maximum clearing time for a fault by a protection device and could vary based on the speed of the protection devices and other parameters.

To provide the update to the impedance set point $Z_{set}$ in this manner for one non-limiting example, the output of the OR gate 60 is provided to one input of an AND gate 72 and the received conditional flag from the downstream device 20 through the communications module 48 is inverted by an inverter 74 and provided to the other input of the AND gate 72, where the output of the AND gate 72 is sent to a 6-cycle delay latch 76. Therefore, if the real component of the measured impedance Re(Z) is less than 70% of the real component of the impedance set point Re($Z_{set}$) or the imaginary component of the measured impedance Im(Z) is less than 70% of the imaginary component of the impedance set point Im($Z_{set}$), and the communicated conditional flag is 0, the impedance set point $Z_{set}$ will be updated to be the measured impedance Z at that time after a 6-cycle delay.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for operating an adaptive impedance protection scheme in a power network including interrupting devices dispersed along an AC power line, the method comprising:

determining a measured impedance on the power line in an upstream interrupting device;

determining a variable impedance set point in the upstream interrupting device;

identifying a predetermined percentage of the impedance set point;

determining if the measured impedance falls below the predetermined percentage of the impedance set point;

determining whether a change in a measured current value on the power line is less than a threshold change value in a downstream interrupting device;

sending the determination of whether the change in the measured current value is less than the threshold change value from the downstream interrupting device to the upstream interrupting device; and opening the upstream interrupting device if the measured impedance falls below the predetermined percentage of the impedance set point and the change in the measured current value in the downstream interrupting device is less than the threshold change value.

2. The method according to claim 1 wherein determining the measured impedance and the impedance set point include determining a real component and an imaginary component of the measured impedance and the impedance set point, and wherein determining if the measured impedance falls below the predetermined percentage of the impedance set point includes determining if either the real component of the measured impedance or the imaginary component of the measured impedance falls below the real component of the predetermined percentage of the impedance set point or the imaginary component of the predetermined percentage of the impedance set point.

3. The method according to claim 1 wherein the impedance set point is the measured impedance at a particular point in time.

4. The method according to claim 3 wherein the impedance set point is updated with the measured impedance if the measured impedance falls below the predetermined percentage of the impedance set point and the change in the measured current value by the downstream interrupting device is greater than the threshold change value.

5. The method according to claim 4 wherein the impedance set point is updated with the measured impedance a predetermined time after the measured impedance falls below the predetermined percentage of the impedance set point and the change in the measured current value by the downstream interrupting device is greater than the threshold change value.

6. The method according to claim 5 wherein the predetermined time is six current cycles.

7. The method according to claim 1 wherein the change in the measured current value is the absolute value of the measured instantaneous current minus the absolute value of the measured instantaneous current one cycle prior.

8. The method according to claim 1 wherein the threshold current value is 1 amp.

9. The method according to claim 1 wherein the predetermined percentage is 70%.

10. A method for operating an adaptive impedance protection scheme in a power network including interrupting devices dispersed along an AC power line, the method comprising:

determining a measured impedance on the power line in an upstream interrupting device, where the measured impedance includes a real component and an imaginary component;

determining a variable impedance set point in the upstream interrupting device, where the impedance set point includes a real component and an imaginary component;

identifying a predetermined percentage of the impedance set point;

determining if either the real component of the measured impedance or the imaginary component of the measured impedance falls below the real component of the predetermined percentage of the impedance set point or the imaginary component of the predetermined percentage of the impedance set point;

determining whether a change in a measured current value on the power line is less than a threshold change value in a downstream interrupting device;

sending the determination of whether the change in the measured current value is less than the threshold change value from the downstream interrupting device to the upstream interrupting device;

opening the upstream interrupting device if the real component of the measured impedance or the imaginary component of the measured impedance falls below the real component of the predetermined percentage of the impedance set point or the imaginary component of the predetermined percentage of the impedance set point and the change in the measured current value is less than the threshold change value; and updating the impedance set point with the measured impedance a predetermined time after the real component of the measured impedance or the imaginary component of the measured impedance falls below the real component of the predetermined percentage of the impedance set point or the imaginary component of the predetermined percentage of the impedance set point and the change in the measured current value is greater than the threshold change value.

11. The method according to claim 10 wherein the predetermined time is six current cycles.

12. The method according to claim 10 wherein the change in the measured current value is the absolute value of the measured instantaneous current minus the absolute value of the measured instantaneous current one cycle prior.

13. The method according to claim 10 wherein the threshold current value is 1 amp.

14. The method according to claim 10 wherein the predetermined percentage is 70%.

15. A system for operating an adaptive impedance protection scheme in a power network including interrupting devices dispersed along an AC power line, the system comprising:

a controller including at least one processor and a memory device storing data and executable code that, when executed, causes the at least one processor to:

determine a measured impedance on the power line in an upstream interrupting device;

determine a variable impedance set point in the upstream interrupting device;

identify a predetermined percentage of the impedance set point;

determine if the measured impedance falls below the predetermined percentage of the impedance set point;

determine whether a change in a measured current value on the power line is less than a threshold change value in a downstream interrupting device;

send the determination of whether the change in the measured current value is less than the threshold change value from the downstream interrupting device to the upstream interrupting device; and open the upstream interrupting device if the measured impedance falls below the predetermined percentage of the impedance set point and the change in the measured current value is less than the threshold change value.

16. The system according to claim 15 wherein the processor determines a real component and an imaginary component of the measured impedance and the impedance set point, and wherein the processor determines if either the real component of the measured impedance or the imaginary component of the measured impedance falls below the real component of the predetermined percentage of the impedance set point or the imaginary component of the predetermined percentage of the impedance set point.

17. The system according to claim 15 wherein the impedance set point is the measured impedance at a particular point in time.

18. The system according to claim 17 wherein the impedance set point is updated with the measured impedance if the measured impedance falls below the predetermined percentage of the impedance set point and the change in the measured current value is greater than the threshold change value.

19. The system according to claim 18 wherein the impedance set point is updated with the measured impedance a predetermined time after the measured impedance falls below the predetermined percentage of the impedance set point and the change in the measured current value is greater than the threshold change value.

20. The system according to claim 15 wherein the change in the measured current value is the absolute value of the measured instantaneous current minus the absolute value of the measured instantaneous current one cycle prior.

* * * * *